US010138169B2

(12) United States Patent
Weimer et al.

(10) Patent No.: US 10,138,169 B2
(45) Date of Patent: Nov. 27, 2018

(54) HIGHLY POROUS CERAMIC MATERIAL AND METHOD OF USING AND FORMING SAME

(75) Inventors: Alan W. Weimer, Niwot, CO (US); Xinhua Liang, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 1092 days.

(21) Appl. No.: 14/009,918

(22) PCT Filed: Apr. 3, 2012

(86) PCT No.: PCT/US2012/032028
§ 371 (c)(1),
(2), (4) Date: Feb. 19, 2014

(87) PCT Pub. No.: WO2012/138671
PCT Pub. Date: Oct. 11, 2012

(65) Prior Publication Data
US 2014/0158613 A1    Jun. 12, 2014

Related U.S. Application Data

(60) Provisional application No. 61/471,638, filed on Apr. 4, 2011.

(51) Int. Cl.
| C04B 38/00 | (2006.01) |
| C04B 38/06 | (2006.01) |
| B01D 39/20 | (2006.01) |
| B01J 8/24 | (2006.01) |
| C04B 38/08 | (2006.01) |
| C04B 35/10 | (2006.01) |
| C04B 35/46 | (2006.01) |
| B82Y 40/00 | (2011.01) |
| C04B 111/00 | (2006.01) |

(52) U.S. Cl.
CPC ...... *C04B 38/0051* (2013.01); *B01D 39/2093* (2013.01); *B01J 8/24* (2013.01);
(Continued)

(58) Field of Classification Search
CPC .......... B28B 1/50; C04B 38/00; C04B 41/81; C04B 38/06
See application file for complete search history.

(56) References Cited

U.S. PATENT DOCUMENTS

| 6,613,383 B1 * | 9/2003 | George | ............ B01J 2/006 427/212 |
| 2006/0088470 A1 * | 4/2006 | Larsson | ............ B01J 20/0211 423/702 |

(Continued)

FOREIGN PATENT DOCUMENTS

WO    WO 2009061795 A1 *   5/2009    ............ C01B 3/042

OTHER PUBLICATIONS

Liang, X. H.; George, S. M.; Weimer, A. W.; Li, N.-H.; Blackson, J. H.; Harris, J. D.; Li, P. Chem. Mater. 2007, 19, 5388-5394.*
(Continued)

*Primary Examiner* — Erin Snelting
(74) *Attorney, Agent, or Firm* — Snell & Wilmer L.L.P.

(57) ABSTRACT

The present invention generally relates to porous ceramic material and to methods of making and using the material. More particularly, the invention relates to methods of forming ceramic materials by depositing material, using atomic layer deposition, onto a sacrificial substrate and to ceramic materials having controlled wall thickness, relatively large pores, and high surface area by weight.

20 Claims, 7 Drawing Sheets

(52) U.S. Cl.
CPC .............. *C04B 35/10* (2013.01); *C04B 35/46* (2013.01); *C04B 38/00* (2013.01); *C04B 38/08* (2013.01); *B82Y 40/00* (2013.01); *C04B 2111/0081* (2013.01); *C04B 2111/00801* (2013.01); *C04B 2235/3274* (2013.01); *C04B 2235/3289* (2013.01)

(56) References Cited

U.S. PATENT DOCUMENTS

| | | | |
|---|---|---|---|
| 2009/0191101 A1* | 7/2009 | Elam | B01J 8/1836 422/139 |
| 2010/0178468 A1* | 7/2010 | Jiang | B01D 67/0002 428/164 |
| 2011/0312080 A1* | 12/2011 | Hatton | A61L 27/40 435/289.1 |

OTHER PUBLICATIONS

X. X Liang, n. H. Li, a.W. Weimer, Template-directed synthesis of porous alumina particles with precise wall thickness control via atomic layer deposition, Microporous Mesoporous Mater. 149 (2012) 106-110.*

Wang, C. C.; Kei, C. C.; Yu, Y. W.; Perng, T. P. Organic Nanowire-Templated Fabrication of Alumina Nanotubes by Atomic Layer Deposition. Nano Lett. 2007, 7, 1566-1569.*

WIPO; International Preliminary Report on Patentability dated Oct. 8, 2013 (including the Written Opinion dated Nov. 16, 2012) in corresponding International Application No. PCT/US2012/032028.

Chiu, J. et al., "Organic Semiconductor Nanowires for Field Emission," Advanced Materials, 2003, 15, No. 16, Aug. 15, 2003, pp. 1361-1364.

Wang, C. et al., Supporting information for "Organic Nanowire-Templated Fabrication of Alumina Nanotubes by Atomic Layer Deposition," Nano Lett. 2007, 7, pp. 1566-1569, 2 pages.

* cited by examiner

FILED VIA EFS-WEB

FIG. 7

HIGHLY POROUS CERAMIC MATERIAL AND METHOD OF USING AND FORMING SAME

CROSS REFERENCE TO RELATED APPLICATIONS

This application is the national stage entry of International Application No. PCT/US12/32028, entitled "HIGHLY POROUS CERAMIC MATERIAL AND METHOD OF USING AND FORMING SAME," filed on Apr. 3, 2012, and claims the benefit of U.S. Provisional Application Ser. No. 61/471,638, filed Apr. 4, 2011, both of which are incorporated herein by reference, to the extent such applications do not conflict with the present disclosure.

GOVERNMENT LICENSE RIGHTS

This invention was made with government support under grant number DE-FG36-05G015044 awarded by the U.S. Department of Energy. The government has certain rights in the invention.

FIELD OF INVENTION

The present invention relates, generally, to highly porous ceramic materials. More particularly, the invention relates to highly porous ceramic materials formed using atomic layer deposition of material onto sacrificial substrates and to methods of forming and using the highly porous ceramic materials.

BACKGROUND OF THE INVENTION

Porous ceramic materials have many desirable properties, such as light weight, high surface area to weight ratio, and high chemical and thermal stability. As a result, applications of such ceramic materials extend into various fields, including environmental, energy, biotechnology, and others. For example, porous alumina may be used in a wide range of applications, such as separators, filters, adsorbents, abrasives, catalysts, and catalyst supports, and the desired porosity may depend on the particular application.

Various properties of the porous ceramic materials may depend on the material itself, techniques used to form the material, and on the desired application. Often the porous ceramic material includes relatively small diameter pores and low pore volume, resulting in a high pressure drop across the ceramic material. When such materials are used in a reactor, such as a fixed bed reactor, the high pressure drop may be disadvantageous.

Several methods for the fabrication of porous ceramics, such as porous alumina, have been studied. For example, template-directed approaches have been employed to form nano-/microscale porous structures. Recently, a great deal of effort has been placed on the synthesis of mesoporous alumina with a high specific surface area and large pore volume using various templates, including surfactants, carboxylic acids, and single organic molecules. However, these techniques have not led to the synthesis of porous alumina monoliths and particles with crystallized frameworks and controlled wall thickness. Accordingly, improved techniques for forming highly porous ceramic materials with relatively large pores are desired.

SUMMARY OF THE INVENTION

The present invention generally relates to porous ceramic material and to methods of making and using the material. More particularly, the invention relates to methods of forming ceramic materials having high porosity in the range of at least about 50%, or about 50 to about 95%, or about 70 to 90%, or higher, by depositing material onto a sacrificial substrate and to ceramic materials having controlled wall thickness (e.g., in the range of about 0.1 to about 100 nm or about 1 to about 5 nm), relatively large cavities (e.g., up to 50 μm or about 1 to about 50 μm) and pores ranging from small pores to a maximum of about 20% of cavity diameter (e.g., large pore diameters in the range of up to about 10 μm, or about 3 nm to about 6 μm, or about 10 nm to about 0.4 μm or about up to about 1 μm, or about 5 nm to about 100 μm, or about 10 nm to about 0.1 μm), and high surface area by weight (e.g., greater than 50 $m^2/g$, or about 50 to about 150 or about 150 to about 300 or about 300 to about 1000 $m^2/g$, or greater than 100 $m^2/g$, or about 1 to about 300 or about 10 to about 200 or about 50 to about 100 $m^2/g$, or about 10 to 1000 $m^2/g$). The structure may include cavities and pores that are interconnected.

In accordance with various embodiments of the invention, a porous ceramic material is formed by providing a sacrificial polymer substrate, such as porous resin material (e.g., having large cavities up to 50 μm) having pores sizes in the range of up to about 100 nm or up to about 10 μm), depositing ceramic material onto the sacrificial polymer substrate using atomic layer deposition (ALD) techniques, exposing the ceramic material and the sacrificial polymer substrate to an environment that causes the substrate to evaporate, melt, or otherwise disintegrate. In accordance with various aspects of these embodiments, the method further comprises depositing material, such as a metal ferrite or a noble metal onto the porous ceramic material.

In accordance with additional embodiments of the invention, a porous ceramic material is formed of, for example, a ceramic material deposited via ALD, such as ceramics selected from the group consisting of aluminum oxide and titanium oxide. The exemplary porous ceramic material may have a pore size range in the range of microns, e.g., ranging from about 70 nm to a few microns and has a surface area to gram ratio greater than about 100. In accordance with further aspects, the porous ceramic material includes particles with crystallized frameworks and controlled wall thickness (e.g., ranging from about 0.1 nm to about 100 nm). In accordance with various aspects of these embodiments, a material composition includes the porous ceramic material and additional material (e.g., noble metals, such as platinum and/or ferrite metals such as cobalt or nickel ferrite materials) coated onto the porous ceramic material. The porous ceramic materials and/or compounds including the porous ceramic materials may be useful in, for example, fixed bed reactors, separators, catalysts, drug delivery of active agents, cell culture applications, enzyme immobilization, bioprocessing, and chromatography, as adhesive, and the like where low pressure drop and rapid heating of reactants are desired, as filters, and the like.

These and other features and advantages of the present invention will become apparent upon a reading of the following detailed description when taken in conjunction with the drawing figures, wherein there is shown and described various illustrative embodiments of the invention.

BRIEF DESCRIPTION OF THE DRAWING FIGURES

The exemplary embodiments of the present invention will be described in connection with the appended drawing figures in which like numerals denote like elements and.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF THE INVENTION

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

The present disclosure provides an improved porous ceramic material and methods of forming and using the ceramic material. As set forth in more detail below, the porous ceramic material in accordance with various exemplary embodiments may be used in a variety of applications and is particularly well suited for catalysis, fixed bed reactors, and filters.

A method of forming porous ceramic material includes providing a sacrificial substrate and depositing, using ALD, ceramic material overlying the sacrificial substrate at a temperature below the melting, transition, or deformation temperature of the sacrificial substrate. The substrate and ceramic material are then exposed to an environment that causes the substrate to sublime, dissolve, evaporate, or otherwise disintegrate, to form a free-standing porous ceramic material, which may be conformal or substantially conformal to the features of the sacrificial substrate. The porous ceramic material may be exposed, during or after the removal of the sacrificial substrate, to an elevated temperature to crystallize at least a portion of the ceramic material.

The sacrificial substrate is used as a template for the formation of the ceramic material. The sacrificial substrate may be formed from a variety of materials, such as polymers or silica gel. Exemplary polymers suitable for use as a sacrificial substrate include resins, such as DOWLEX™ PE-RT resins, available from the Dow Chemical company, highly porous poly(styrene-divinylbenzene) (PS-DVB) particles, particularly those available as Cavilink™, and other high internal phase emulsion, HIPE, polymers formed by suspension or solution polymerization, and may be in a variety of forms, such as particles.

The ceramic material is deposited using ALD. ALD is a surface controlled layer-by-layer process and is independent of line of sight. ALD enables precise deposition of ultra-thin, highly conformal coatings over complex 3D topography structures (e.g., the sacrificial substrate), with excellent control over stoichiometry and properties. The films grown by ALD are inherently controlled by self-limiting sequential surface chemical reactions, so precursors are used efficiently.

As set forth in more detail below, the ceramic material may be deposited on polymer particles in a fluidized bed reactor, wherein the sacrificial substrate is subjected to one or more reaction cycles, each of which reaction cycle includes a first subcycle to expose the substrate to a first precursor, a purge, an evacuation, and a second subcycle to expose the substrate to a second precursor. The cycles can be repeated for any number of desired times to obtained porous ceramic material having controlled wall thickness, controlled pore diameter, and controlled surface area.

As noted above, once the sacrificial substrate is removed (e.g., using a calcination process) the porous ceramic structures may be coated with a noble metal or a metal ferrite material in accordance with additional embodiments of the invention. Exemplary metal ferrite materials and techniques for depositing the ferrite materials are disclosed in WO 2009/061795, entitled METAL FERRITE SPINEL ENERGY STORAGE DEVICES AND METHODS OF MAKING SAME, international filing date of Nov. 5, 2008, the contents of which, to the extent the contents do not conflict with the present application, are incorporated herein by reference.

EXAMPLES

The following non-limiting examples illustrate exemplary porous ceramic materials and methods of forming porous ceramic materials in accordance with various embodiments of the invention. These examples are merely illustrative, and it is not intended that the invention be limited to the examples.

Highly porous PS-DVB particles were obtained by the copolymerization of styrene and divinylbenzene. The particles had particle size of ~600 μm, a porosity of 85%, a pore volume of 8-10 $cm^3/g$, a surface area of 43.5 $m^2/g$, and a density of 70 $kg/m^3$. A fluidized bed reactor was used to deposit alumina films on the porous PS-DVB particles by ALD. The system was operated at reduced pressures (e.g., about 10 torr or about 3 torr). Deionized $H_2O$ and trimethylaluminum (TMA, 97%, Sigma Aldrich) were used as reactants for $Al_2O_3$ ALD at a reaction temperature of 33° C. High purity nitrogen was used as the purge gas to remove any byproducts formed during the reaction and the unreacted precursor. For a typical run, 2 g of porous particles were loaded into the reactor. Before the reaction, the particles were outgassed overnight at room temperature. Precursors were fed separately through the distributor plate at the base of the reactor using the driving force of their room-temperature vapor pressures. A typical coating cycle used the following sequence: precursor TMA dose, $N_2$ purge, evacuation; precursor $H_2O$ dose, $N_2$ purge, evacuation. Three thicknesses of alumina films (25, 50, and 100 cycles) were deposited on polymer substrates.

Thermo-gravimetric analysis of the alumina coated polymer particles was conducted using a TGA/DTA (Netzsch: STA 449 F1 Jupiter®) with a flowing air atmosphere (50 mL/min) at a heating rate of 2° C./min up to 800° C. This monitored the various decomposition reactions occurring as a function of temperature, providing guidance for determining the oxidation and calcination temperatures to be used. To remove the organic constituent after ALD, the alumina coated PS-DVB particles were heated in air at 400° C. for 24 h. Most of the organic constituent would be removed, but a trace amount of carbon would remain on the particle surface, as indicated by a gray appearance of the particles. Calcination was also conducted at 600° C., and 800° C. for an additional 2 h, using a heating rate of 10° C./min. White alumina particles were formed after calcination at 800° C.

The concentration of alumina on the particles was measured by inductively coupled plasma atomic emission spectroscopy (ICP-AES) using an Applied Research Laboratories ICP-AES 3410+. A Quantachrome Autosorb$^{-1}$ was used to obtain nitrogen adsorption and desorption isotherms of the ALD coated particles before and after oxidation in air at −196° C. The specific surface areas of the samples were calculated using the Brunauer-Emmett-Teller (BET) method in the relative pressure range of 0.05-0.25. The total pore volumes were calculated from the adsorption quantity at a relative pressure of $P/P_0$=0.99. The pore size distribution curves were derived from the adsorption branches of the isotherms using the Barrett-Joyner-Halenda (BJH) method. The alumina films coated on polymer particles were observed using a JEOL 2010F 200 kV Schottky field emission transmission electron microscope operating in the scanning transmission electron microscopy (STEM, Z-contrast) mode with an electron probe size of 0.2 nm. STEM samples were prepared by placing the crushed porous particles on holey-carbon films supported on Cu grids. The cross-sectioned porous polymer particles and porous alumina particles were investigated using a JEOL JSM-7401F field emission scanning electron microscope (FESEM) equipped with an EDAXS detector unit for elemental analysis while imaging. At least three spots were analyzed per sample for STEM and FESEM analysis. The X-ray diffraction (XRD) test of the particles was performed using a powder diffractometer.

Figure 1:
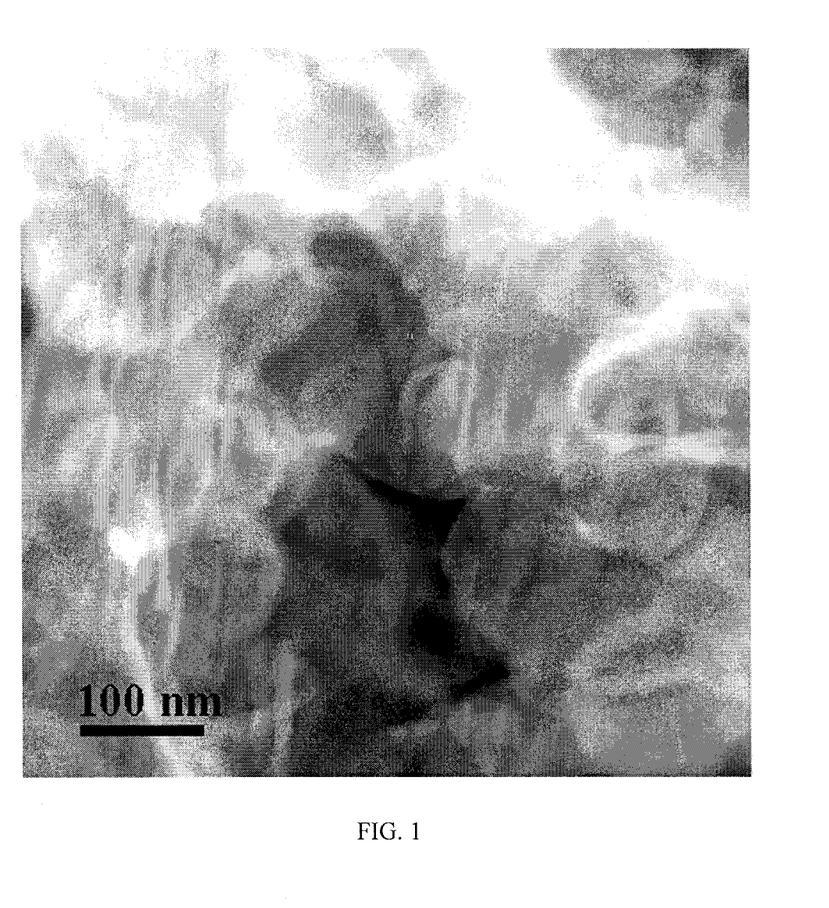
FIG. 1 illustrates a STEM image of 50 cycles of alumina ALD coated PS-DVB particles.

The alumina coated porous polymer particles were analyzed by atomic resolution, Z-contrast imaging. A representative Z-contrast image of the alumina-coated polymer particles after 50 coating cycles is shown in FIG. 1. The regions with a brighter contrast (i.e., regions with heavier Z) in FIG. 1 were alumina films. It is apparent from this and related images that the alumina films of 50 cycles grown on the internal and external polymer particle surfaces appeared to be relatively smooth. The thickness of the alumina films was 15 nm, which represented a growth rate of ~0.3 nm per coating cycle.

Figure 2:
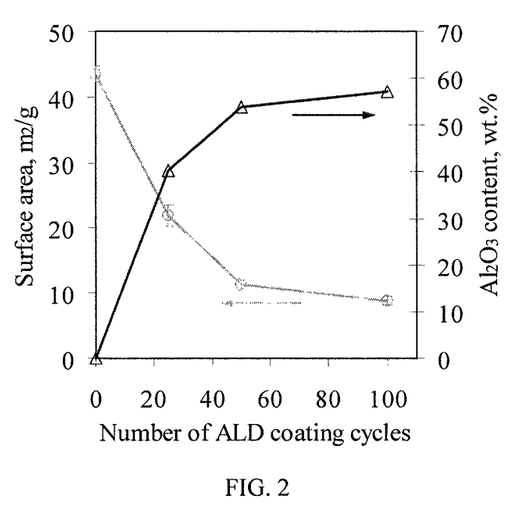
FIG. 2 illustrates alumina content and surface area of the as-coated porous polymer particles versus the number of ALD coating cycles.

FIG. 2 shows that the surface area of the samples decreased with the increase in the number of ALD coating cycles, from 43.5 to 19.4 $m^2/g$ after 25 cycles of alumina ALD coating, and further decreased to 8.8 $m^2/g$ after 100 cycles of alumina ALD coating. The surface area reduction is thought to be due to the pore volume reduction and the increased density as the pore size decreases with increasing thickness of alumina films deposited on the pore walls. The surface area decreased less sharply with the ALD coatings from 50 to 100 cycles, since, it is thought, some nanoscale pores were already filled with alumina. On the other hand, the concentration of alumina on the porous substrate increased with the increase in the number of ALD coating cycles. For example, with 25 cycles of alumina ALD, the alumina concentration was 40.3 wt. %, and increased to 57.2 wt. % with 100 cycles of alumina ALD coating.

Figure 3:
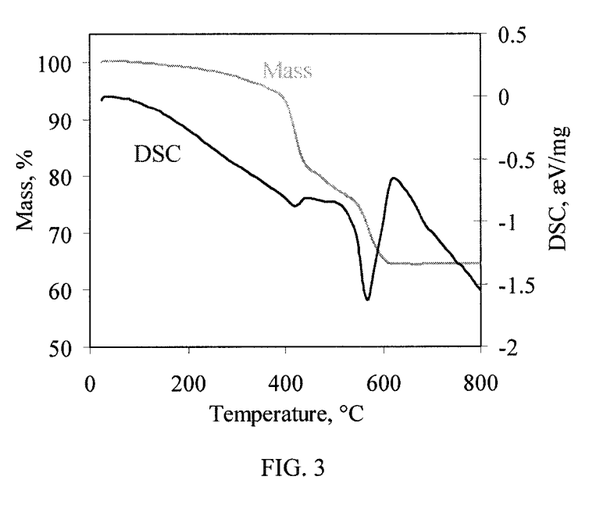
FIG. 3 illustrates TGA/DSC curve of 50 cycles of alumina ALD coated PS-DVB particles measured at a heating rate of 2° C./min.

FIG. 3 shows the TGA/DSC curves of 50 cycles of alumina ALD coated PS-DVB particles measured at a heating rate of 2° C./min. There are two major weight loss events. The first weight loss below 400° C. is due to the desorption of physically adsorbed water and OH groups on the substrate surfaces. The second weight loss event in the temperature range of 400-600° C. is associated with the decomposition of PS-DVB, releasing $CO_2$ and $H_2O$ and forming porous alumina structures. No mass loss was observed when the temperature was above 600° C. FIG. 3 also shows a DSC curve of 50 cycles of alumina ALD coated PS-DVB particles. There is one crystallization peak centered at 620° C. With the removal of the organic component, the resulting porous alumina particles maintained the morphology and shape of the polymer substrates.

Figure 4:
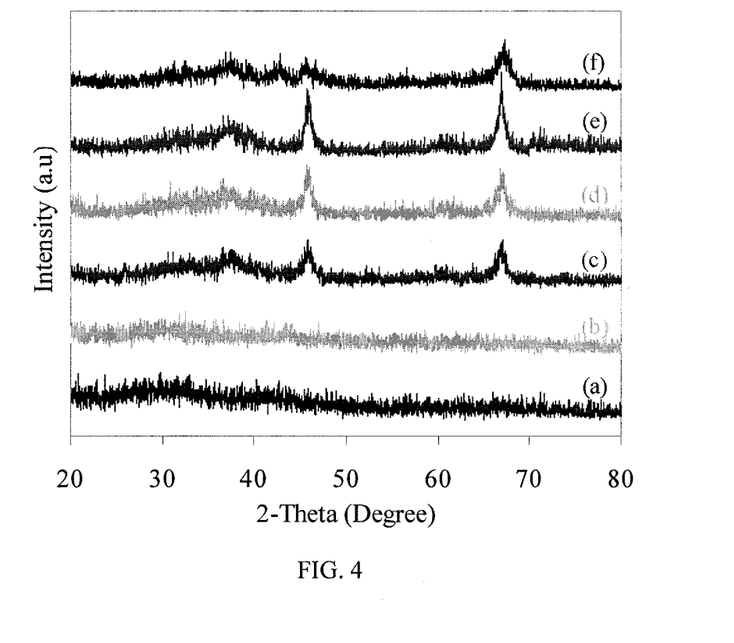
FIG. 4 illustrates XRD patterns of porous alumina particles: (a, b, c) 25 cycles of alumina coated PS-DVB particles (a) oxidized in air at 400° C. for 24 h, (b) heated in air at 600° C. for additional 2 h, (c) heated in air at 800° C. for additional 2 h, (d) 50 cycles of alumina coated PS-DVB particles oxidized in air at 400° C. for 24 h and heated in air at 800° C. for additional 2 h, (e) 100 cycles of alumina coated PS-DVB particles oxidized in air at 400° C. for 24 h and heated in air at 800° C. for additional 2 h, and (f) reference γ-alumina particles.

The atomic crystallinity of the obtained samples after calcination at various temperatures was characterized by XRD patterns (FIG. 4). For the sample with 25 cycles of alumina ALD after oxidation in air at 400° C. for 24 h, no obvious peaks appeared, revealing the amorphous state of the framework; after calcination at 600° C. for an additional 2 h, the framework was still amorphous; when the calcination temperature increased to 800° C., several peaks characteristic of γ-alumina appeared. This result was consistent with the DSC curve, indicating that the crystallization occurred during the 600-800° C. calcination. Alumina has several crystallization states. Crystallized γ-alumina is suitable for catalytic applications. The thickness of the alumina films with 25 cycles of ALD was about 7.5 nm. Alumina particles with thicker alumina films were also crystallized after calcination at 800° C. for an additional 2 h. The low intensity of the XRD peaks indicates that the calcined alumina sample with thinner wall thickness has a lower crystallinity; while the sharp peaks demonstrated that the alumina particles with thicker walls calcined at 800° C. are highly crystallized.

Figure 5A:
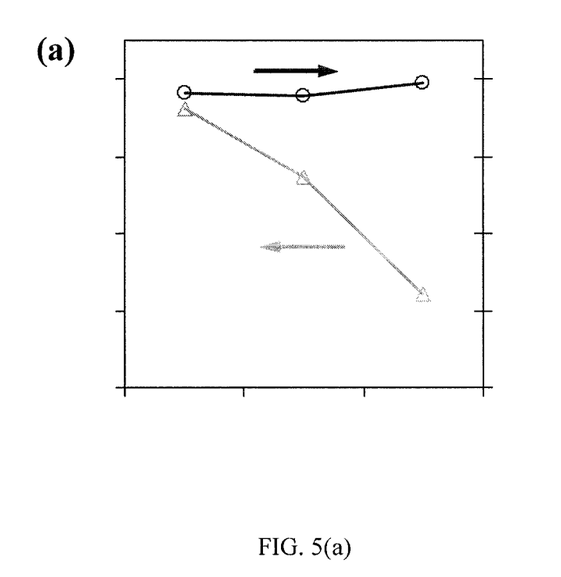
FIG. 5 illustrates (a) surface area, pore volume and (b) pore size distributions of porous alumina particles fabricated from 25 cycles of alumina ALD coated polymer particles oxidized at different temperatures.
Figure 5B:
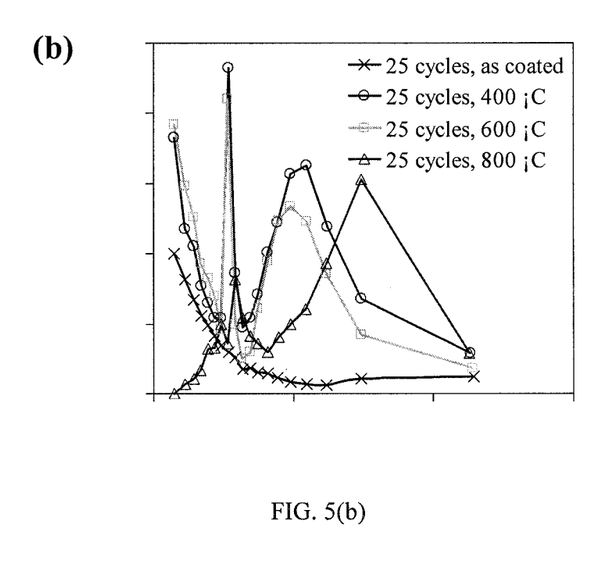

The surface area, pore volume and pore size distributions of porous alumina particles fabricated from 25 cycles of alumina ALD coated polymer particles oxidized or calcined at different temperatures are shown in FIG. 5. After oxidation in air at 400° C. for 24 h, most of the organic component was removed, and the pore volume was as high as 1.0 $cm^3/g$. The surface area of the porous particles greatly increased to 132 $m^2/g$, compared to the surface area of 22 $m^2/g$ for the 25 cycles of alumina ALD coated polymer particles before oxidation. Part of the surface area is thought to result from the formation of some sub-nano sized pores due to the release of gaseous by-products forming porous nano-structures, since the polymer component was sandwiched between two layers of alumina ALD films. With the additional 2 h of calcination at 600° C. or 800° C., the surface area of the particles decreased, which is thought to be because the micropores in the frameworks collapsed during the transformation of amorphous alumina to γ-alumina. The pore volume of the particles remained at about 1.0 cm$^3$/g with the additional 2 h of calcination at 600° C. or 800° C. As shown in FIG. 5b, after removal of the polymer component at 400° C. for 24 h, the number of micropores, mesopores and macropores greatly increased, compared to the as coated polymer particles with 25 cycles of alumina ALD coating. The pore size distribution is wide and pore size lies between 1 and 180 nm.

Porous materials, in accordance with various embodiments of the invention, include mesopores and macropores, and are of considerable interest because they combine the benefits of each pore size regime. A material containing both interconnected mesoporous and macroporous structures has enhanced properties compared to single-size pore materials. Increased mass transport associated with macropores and high surface areas due to mesopores results in higher activities and better-controlled selectivities for certain catalytic reactions.

The porous structure did not change much after calcination at 600° C. In contrast, the number of micropores greatly decreased and the pore size distribution shifted to the right, which means larger pores formed, during crystallization of the alumina films at temperature above 600° C.

Figure 6A:
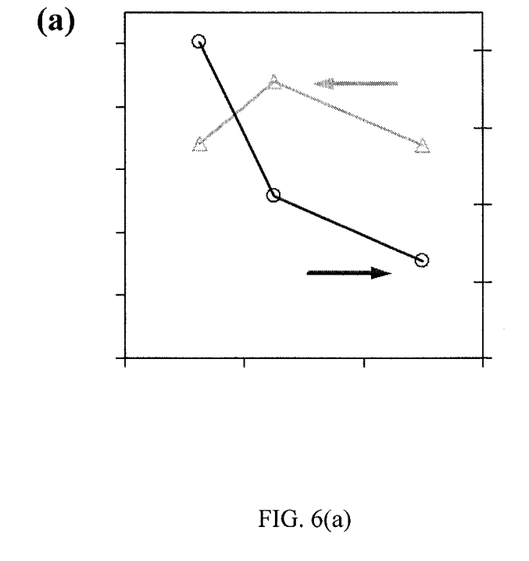
FIG. 6 illustrates (a) surface area, pore volume, and (b) pore size distributions of porous alumina particles fabricated from different number of ALD coating cycles. The alumina coated polymer particles were oxidized in air at 400° C. for 24 h and heated in air at 800° C. for additional 2 h.
Figure 6B:
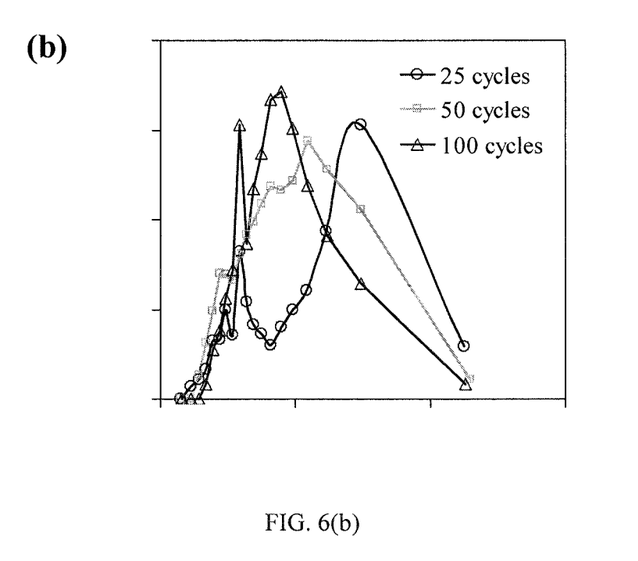

The surface area, pore volume, and pore size distributions of porous alumina particles fabricated with a different number of ALD coating cycles are shown in FIG. 6. The alumina coated polymer particles were oxidized in air at 400° C. for 24 h and heated in air at 800° C. for an additional 2 h. These particles are γ-alumina. With the increase in the number of ALD coating cycles from 25 to 100, the pore volume decreased, from 1.0 cm$^3$/g to 0.45 cm$^3$/g, the result of the thicker pore walls for the additional coating cycles. A maximum in the surface area of the alumina particles was achieved using 50 cycles of alumina ALD. This may be explained as follows: with fewer number of ALD cycles, the pore walls would be thinner and there will be more porous nano-structures, which would contribute to higher surface area; on the other hand, thinner pore walls would be less stable during the calcinations process at 800° C. and the collapse of nano-structures would result in the reduction of surface area. As shown in FIG. 6b, the pore size distribution shifted to the right with the increase in the number of ALD coating cycles, because of the thicker pore walls. The surface area of the porous alumina particles can be easily increased using fewer ALD cycles resulting in thinner walls.

Figure 7:
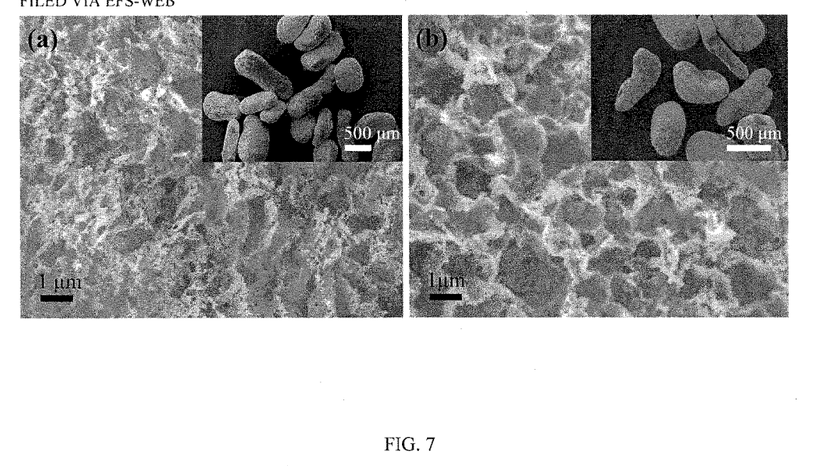
FIG. 7 illustrates FESEM images of cross-sectioned surface of (a) a PS-DVB particle and (b) a porous alumina particle fabricated from 25 cycles of alumina ALD coated PS-DVB particles. The inset image in FIG. 7*a* shows the size of the polymer particles. The inset image in FIG. 7*b* shows the size of the porous alumina particles.

The FESEM image provided in FIG. 7a reveals the structure of the porous PS-DVB particles, while FIG. 7b shows the structure of the porous alumina particle formed after the removal of the PS-DVB core. The macropores of the alumina sample are almost the same size as the polymer substrate. The macropores are three-dimensionally packed and connected by small windows. The size of the macropores is approximately 200 nm. Little dimensional change is observed for the porous alumina particles compared to the original polymer template, as shown in the inset figures. As illustrated, the porous structure is maintained after the removal of the polymer, but the structure of alumina is more rigid than that of the porous polymer. Since ALD films are conformally coated on the polymer substrate surfaces, the morphology and structure of the porous alumina particles are strictly dependent on that of the polymer substrate.

In accordance with exemplary embodiments of the invention, porous ceramic (e.g., alumina) particles with precise wall thickness control are prepared by via ALD. Different thicknesses of ceramic materials can applied on porous sacrificial substrates, such as PS-DVB particles. In the case of alumina, various thicknesses can be obtained, for example, using the alternating reactions of TMA and water at 33° C. The conformal coating of alumina films were observed by STEM. After the PS-DVB was removed by oxidation in air, the resultant particles were characterized by XRD, nitrogen adsorption, and FESEM. γ-alumina was formed at temperature above 600° C. Exemplary porous alumina particles have a surface area of 80-100 m$^2$/g and are thermally stable at 800° C. An important advantage of the exemplary method is that it is possible to tune the thickness of walls and, hence, the surface area by controlling the number of ALD coating cycles, since ALD is a self-limiting vapor-phase process. This strategy can also be used to prepare other inorganic porous structures with precise control of wall thickness, as well as nanoscale tubes and other complex shapes. The porous ceramic (e.g., alumina) particles contain both interconnected mesoporous and macroporous structures, which could have enhanced properties compared to single-size pore materials. Such material can be used for various applications, e.g., those requiring γ-alumina or other ceramic materials having high surface area, high pore volume, large pore size and thin walls. These materials may be highly useful in a broad range of applications including catalysis and separations.

The present invention has been described above with reference to a number of exemplary embodiments and examples. It should be appreciated that the particular embodiments shown and described herein are illustrative of the invention and its best mode and are not intended to limit in any way the scope of the invention. It will be recognized that changes and modifications may be made to the exemplary embodiments without departing from the scope of the present invention. These and other changes or modifications are intended to be included within the scope of the present invention.

The invention claimed is:

1. A method of forming a porous ceramic material, the method comprising the steps of:
   providing polymer sacrificial substrate particles;
   depositing ceramic material onto the polymer sacrificial substrate particles using atomic layer deposition techniques to form a continuous layer of the ceramic material overlying the polymer sacrificial substrate particles; and
   exposing the polymer sacrificial substrate particles and the ceramic material to an environment to cause the polymer sacrificial substrate particles to disintegrate and thereby form a porous ceramic material,
   wherein a surface area per weight of the ceramic material is greater after the step of exposing than the surface area per weight of the ceramic material prior to the step of exposing.

2. The method of forming a porous ceramic material of claim 1, further comprising the step of heating the porous ceramic material to cause the porous ceramic material to crystallize.

3. The method of forming a porous ceramic material of claim 2, wherein the step of heating the porous ceramic material comprises heating the porous ceramic material to a temperature of greater than about 600° C.

4. The method of forming a porous ceramic material of claim 1, wherein the step of exposing comprises heating the polymer sacrificial substrate particles to a temperature of 400° C. to 600° C.

5. The method of forming a porous ceramic material of claim 1, wherein the step of exposing comprises exposing the polymer sacrificial substrate particles to an oxygen environment.

6. The method of forming a porous ceramic material of claim 1, wherein the step of exposing comprises exposing the polymer sacrificial substrate particles to air.

7. The method of forming a porous ceramic material of claim 1, wherein the step of depositing ceramic material comprises depositing ceramic material in a fluidized bed reactor.

8. The method of forming a porous ceramic material of claim 1, further comprising the step of depositing a material selected from the group consisting of noble metals and metal ferrites onto the porous ceramic material.

9. The method of forming a porous ceramic material of claim 1, further comprising the step of depositing metal ferrites onto the porous ceramic material.

10. The method of forming a porous ceramic material of claim 1, wherein the step of depositing ceramic material onto the polymer sacrificial substrate particles comprises depositing material selected from the group consisting of aluminum oxide and titanium oxide.

11. The method of forming a porous ceramic material of claim 1, wherein the step of providing polymer sacrificial substrate particles comprises providing a resin.

12. The method of forming a porous ceramic material of claim 1, wherein the step of providing polymer sacrificial substrate particles comprises providing a material selected from the group consisting of one or more of resins, poly (styrene-divinylbenzene) (PS-DVB) particles, and other high internal phase emulsion polymers formed by suspension or solution polymerization.

13. The method of forming a porous ceramic material of claim 1, wherein the porous ceramic material comprising material selected from the group consisting of aluminum oxide and titanium oxide, and having an average pore volume of about 50 to about 95% and having a surface area to weight ratio of about 10 $m^2/g$ to about 1000 $m^2/g$.

14. The method of forming a porous ceramic material of claim 13, wherein the material is γ-alumina.

15. The method of forming a porous ceramic material of claim 1, wherein the porous ceramic material comprises mesopores and macropores.

16. The method of forming a porous ceramic material of claim 15, wherein the mesopores and macropores are interconnected.

17. The method of forming a porous ceramic material of claim 1, wherein the porous ceramic material comprises a wall thickness ranging from about 0.1 nm to about 100 nm.

18. The method of forming a porous ceramic material of claim 1, wherein the porous ceramic material comprises cavities in the size range of from about 1 to about 50 μm and interconnected pores.

19. The method of forming a porous ceramic material of claim 1, further comprising a step of forming a layer comprising one or more noble metals.

20. The method of forming a porous ceramic material of claim 1, wherein a number of micropores, mesopores and macropores of the porous ceramic material is greater than the number of micropores, mesopores and macropores of the ceramic material.

\* \* \* \* \*